United States Patent
Báder et al.

(10) Patent No.: US 11,140,051 B2
(45) Date of Patent: Oct. 5, 2021

(54) SYSTEM AND METHOD FOR MONITORING AND OPTIMIZATION OF REMOTE ROBOT CONTROL USING MOBILE NETWORKS

(71) Applicant: Telefonaktiebolaget LM Ericsson (publ), Stockholm (SE)

(72) Inventors: Attila Báder, Paty (HU); Attila Nagy, Fót (HU); Sándor Rácz, Cegléd (HU); Geza Szabo, Kecskemet (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/769,277

(22) PCT Filed: Jan. 2, 2018

(86) PCT No.: PCT/EP2018/050036
§ 371 (c)(1),
(2) Date: Jun. 3, 2020

(87) PCT Pub. No.: WO2019/134733
PCT Pub. Date: Jul. 11, 2019

(65) Prior Publication Data
US 2020/0374204 A1 Nov. 26, 2020

(51) Int. Cl.
*G06F 15/173* (2006.01)
*H04L 12/26* (2006.01)
*H04L 29/08* (2006.01)

(52) U.S. Cl.
CPC ............ *H04L 43/04* (2013.01); *H04L 67/125* (2013.01)

(58) Field of Classification Search
CPC ....... H04L 43/04; H04L 67/125; G05B 19/00; G05B 2219/50391; G05B 2219/31457
(Continued)

(56) References Cited

U.S. PATENT DOCUMENTS

| 2005/0080799 A1* | 4/2005 | Hamden | ................ H04L 63/102 |
| 2005/0216302 A1* | 9/2005 | Raji | ....................... H04L 67/025 |
| | | | 705/314 |

(Continued)

OTHER PUBLICATIONS

Thomas, P. et al., "An Introduction to Profinet Frame Analysis Using WireShark", vol. 1.0, Jul. 5, 2013, pp. 1-16, Profinet.

*Primary Examiner* — Johnny B Aguiar
(74) *Attorney, Agent, or Firm* — Coats & Bennett, PLLC (57) ABSTRACT

The present invention aims at an improvement of robot control monitoring and optimization in mobile networks in support of remote robot control services for robot devices. Heretofore, an analytics system (26) provides service quality information to a Cloud-based remote control system (22). Also, the Cloud-based remote control system (22) issues control requests to a local control unit (30) for control of a robotic device (24) and a mobile communication network (28) connects the Cloud-based remote control system (22) with the local control unit (30). Service event information is collected and associated with control requests issued by the Cloud-based remote control system (22). On the basis of the collected service event information a processing unit (30) correlates the service event information with the associated control request, calculates at least one key performance indicator from the result of correlation, analyzes the at least one key performance indicator for identification of a poor service quality incidence, and generates a service quality report based on the result of analysis upon occurrence of a poor service quality incidence.

18 Claims, 7 Drawing Sheets

(58) Field of Classification Search
USPC .......................................... 709/217, 218, 224
See application file for complete search history.

(56) References Cited

U.S. PATENT DOCUMENTS

| | | | |
|---|---|---|---|
| 2010/0148940 A1* | 6/2010 | Gelvin | H04L 67/12 340/286.02 |
| 2016/0112283 A1 | 4/2016 | Maturana et al. | |
| 2016/0182309 A1* | 6/2016 | Maturana | G06F 30/20 709/224 |
| 2017/0285622 A1* | 10/2017 | Figoli | H04L 69/08 |
| 2017/0339584 A1 | 11/2017 | Ketonen et al. | |
| 2018/0176111 A1* | 6/2018 | Lopes | H04W 24/08 |

* cited by examiner

SYSTEM AND METHOD FOR MONITORING AND OPTIMIZATION OF REMOTE ROBOT CONTROL USING MOBILE NETWORKS

FIELD OF INVENTION

The present invention relates to robot control monitoring and optimization in mobile networks, and in more detail to an analytics system for providing service quality information to a Cloud-based remote control system, a Cloud based remote control system using the service quality information for remote control of a robotic device, and related operative method.

BACKGROUND ART

There is a tendency of moving robotics control and automation algorithms into remote Cloud networks. Here, Cloud and network operators can provide different level of services.

The lowest level is Infrastructure as a Service (IaaS), where bare operating systems are provided on—possibly virtualized—machines in the Cloud.

The second level, Platform as a Service (PaaS), provides more structure, including application frameworks and database access, while restricting the choice of programming languages, system architectures, and database models that can be used.

The highest level of structure which is missing these days would be Software as a Service (SaaS). Commercially available are Cloud-based software platforms and leverages leading Cloud, web, and mobile technologies. It allows customers to easily access and analyze robots data on any device, anywhere at any time.

Further, another aspect of Cloud robotics is how the robot related functionality is moved into the Cloud.

The simplest way is to run the original robot specific task in the Cloud without significant change of it. For example, in a virtual machine (VM), in a container, or in a virtualized programmable logic controller PLC.

Other way is to update/modify/rewrite the code of robot related task to utilize existing services/APIs of the Cloud.

The third way is to extend the Cloud platform itself with new features that makes robot control more efficient. These new robot aware Cloud features can be explicitly used by robot related tasks—i.e. new robot aware services/APIs offered by the Cloud—or can be transparent solutions, e.g., improve the service provided by the Cloud to meet the requirement of the robot control.

However, while the current analytics solutions for mobile networks provide monitoring and optimization for mobile broadband and call-related services there is a lack of solutions for monitoring and optimization for robotic control in mobile networks.

Further, mobile networks involve a radio interface which is critical from a performance point of view. The quality of transmission strongly depends on the actual radio conditions which can widely vary.

Here, existing analytics solutions for remote control services correlate radio network information with user and control plane metrics in order to provide information about service quality level and possible root cause for the 3GPP services (Mobile Broadband (MBB) and LTE services).

However, these analytics solutions have no information about the performance of the robotic devices and they do not provide any info about the quality of the robotic control service. Further, they do not provide any info which could be used to improve the control service.

SUMMARY OF INVENTION

In view of the above, the object of the present invention is to provide an improved approach to robot control monitoring and optimization in mobile networks in support of remote robot control services for robot devices.

According to a first aspect of the present invention this object is achieved by an analytics system for providing service quality information to a Cloud-based remote control system. Here, the Cloud-based remote control system issues control requests to a local control unit for control of a robotic device and a mobile communication network connects the Cloud-based remote control system with the local control unit. The analytics system comprises a collecting unit which collects service event information in relation to an associated control request issued by the Cloud-based remote control system from the mobile communication network, the local control unit, and/or a monitoring unit monitoring the robotic device. On the basis of the collected service event information a processing unit (30) correlates the service event information with the associated control request, calculates at least one key performance indicator from the result of correlation, analyzes the at least one key performance indicator for identification of a poor service quality incidence, and generates a service quality report based on the result of analysis upon occurrence of a poor service quality incidence. Then, a reporting unit communicates the service quality report to the Cloud-based remote control system and/or a network management system of the mobile communication network.

According to a second aspect of the present invention the object outlined above is achieved by a Cloud-based remote control system for a robotic device. The Cloud-based remote control system comprises a remote control unit operated in a Cloud-based system and which runs a remote control service for control of the robotic device, a local control unit which controls the robotic device on the basis of at least one control request issued by the remote control unit, and a mobile communication network which establishes a communication link between the remote control unit and the local control unit. Further, the Cloud-based remote control system comprises an analytics system according to the first aspect of the invention that reports service quality information as basis for running the remote control service.

According to a third aspect of the present invention the object outlined above is achieved by an analysis method for providing service quality information to a Cloud-based remote control system. As with the first aspect of the present invention the Cloud-based remote control system issues control requests to a local control unit for control of a robotic device and a mobile communication network connects the Cloud-based remote control system with the local control unit. The analysis method comprises a step of collecting service event information in relation to an associated control request issued by the Cloud-based remote control system from the mobile communication network, the local control unit, and/or a monitoring unit monitoring the robotic device. Subsequent hereto there is executed a step of processing to correlate the service event information with the associated control request, calculate at least one key performance indicator from the result of correlation, analyze the at least one key performance indicator for identification of a poor service quality incidence, and to generate a service quality report based on the result of analysis upon occurrence of a poor service quality incidence. Finally, the analysis method comprises a step of reporting the service quality report to the Cloud-based remote control system and/or a network management system of the mobile communication network.

According to a fourth aspect of the present invention the object outlined above is achieved by a Cloud-based remote control multi-process architecture for robot control monitoring and optimization comprising a plurality of partial processes executed in parallel. The multi-process architecture is designed to comprise a first process of executing a remote control process in a Cloud-based remote control system to provide a remote control service for a robotic device, a second process of executing a local control process of the robotic device on the basis of at least one control request issued by execution of the first process, a third process of maintaining a communication link via a mobile communication network between the first process for remote control and the second process for local control, and a fourth process of providing service quality information for use in the first process for remote control through execution of an analysis method according to the third aspect of the present invention.

BRIEF DESCRIPTION OF DRAWING

In the following the present invention will be explained with references to the drawing in which.

DETAILED DESCRIPTION OF INVENTION

In the following the present invention will be described with reference to the drawing and examples thereof. It should be noted that clearly the present invention may also be implemented using variations and modifications thereof which will be apparent and can be readily made by those skilled in the art without departing from the scope of the present invention as defined by the claims. E.g., functionalities described above may be realized in software, in hardware, or a combination thereof.

Accordingly, it is not intended that the scope of claims appended hereto is limited to the description as set forth herein, but rather that the claims should be construed so as to encompass all features that would be treated as equivalent thereof by those skilled in the art to which the present invention pertains.

Figure 1:
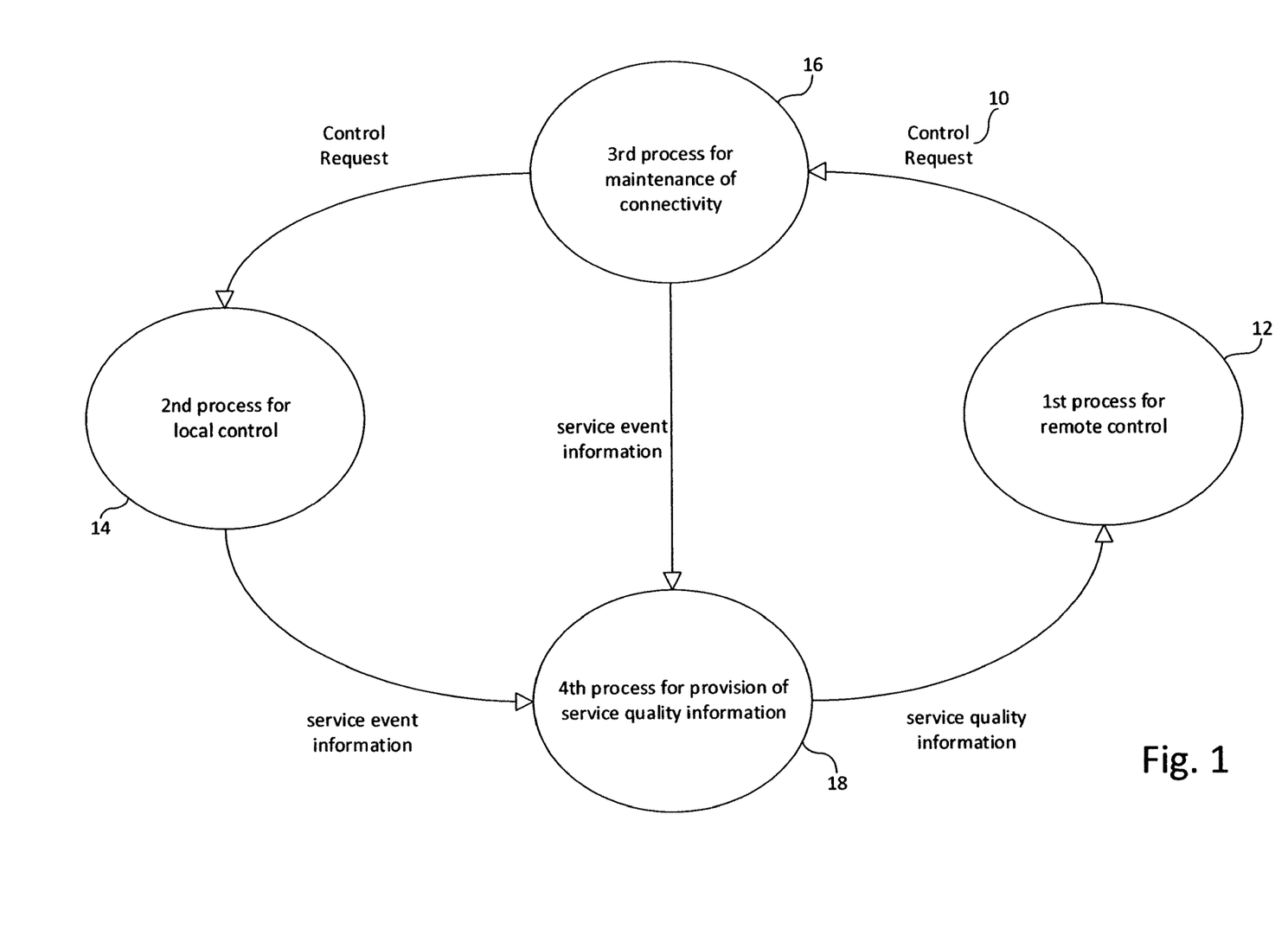
FIG. 1 shows a Cloud-based remote control multi-process system architecture for robot control monitoring and optimization according to the present invention.

FIG. 1 shows a Cloud-based remote control multi-process system architecture for robot control monitoring and optimization according to the present invention.

Generally and as explained in detail in the following, the present invention relates to a system where the Cloud and Network operators provide Platform as a Service PaaS and Software as a Service (SaaS) in a remote Cloud network and where the connection to the controlled robot devices is provided by mobile networks.

As shown in FIG. 1, the Cloud-based remote control multi-process architecture for robot control monitoring and optimization 10 comprises a plurality of partial processes being executed in parallel.

As shown in FIG. 1, a first process 12 relates to execution of a remote control process in a Cloud-based remote control system to provide a remote control service for a robotic device.

As shown in FIG. 1, a second process 14 relates to execution of a local control process of the robotic device on the basis of at least one control request issued by executing of the first process for remote control.

As shown in FIG. 1, a third process 16 relates to maintenance of a communication link via a mobile communication network between the first process for remote control and the second process for local control.

As shown in FIG. 1, a fourth process 18 relates to provision of service quality information for use in the first process for remote control through execution of an analysis method according to the present invention to be explained in more detail in the following. This implies monitoring a robotic device and capturing service event information for use by the analytics method using at least one capturing point provided in relation to a network domain of the mobile communication network, control unit and/or the monitoring unit.

Here it should be noted that the Cloud-based remote robot control system architecture 10 according to the present invention requires a high speed reliable mobile communication network in order to be able to exploit the high-speed processing capacity of the Cloud-based remote robot control system. Candidates are, e.g., current 4G mobile communication networks providing high speed data services for mobile broadband services as well for call type services for voice video and messaging, e.g. VoLTE, ViLTE, RCS. 5G mobile communication networks provide even faster high speed connection for a large number of Internet of Things (IoT) entities.

FIG. 1 also shows the basic flow of information Cloud-based remote robot control system architecture 10.

As shown in FIG. 1, the first process for remote control 12 issues control requests to the second process 14 for remote control. This is achieved through activation of the third process 16 for maintenance of connectivity. Then the fourth process 18 for provision of service quality information will collect service event information from at least the second process 14 for local control and the third process for maintenance of connectivity to provide service quality information to the first process 12 for remote control.

Figure 2:
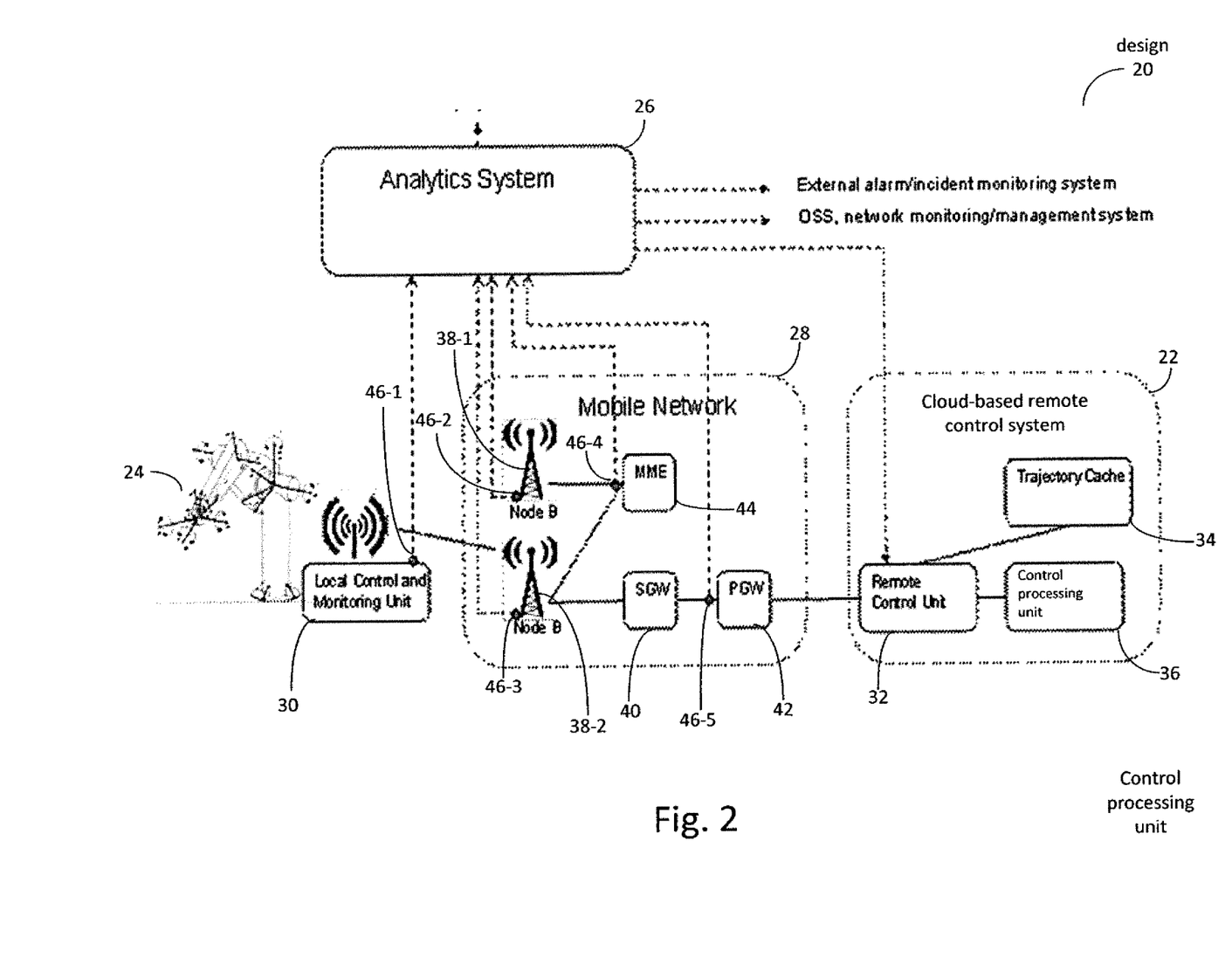
FIG. 2 shows a Cloud-based remote robot control system design used to realize the Cloud-based remote control multi-process system architecture shown in FIG. 1.

FIG. 2 shows a Cloud-based remote robot control system design 20 used to realize the Cloud-based remote control multi-process system architecture shown in FIG. 1.

As shown in FIG. 2, the system design 20 divides into a Cloud-Based remote control system 22 for remote control of a robot device 24, an analytics system 26 for providing service quality information in relation to the remote control, and a mobile communication network 28 connecting the Cloud-Based system 22 to a local control unit 30 of the robot device 24.

As shown in FIG. 2, the mobile communication network 28 comprises at least one base station 38-1, 38-2, a service gate way 40, a packet gateway 42, and a mobility management entity 44. Also the mobile communication network 28 comprises at least one capturing point 46-1, . . . , 46-5 provided in relation to a network domain of the mobile communication network 28, the local control unit 30 and/or a monitoring unit for monitoring the robotic device 24.

Here it should be noted that the functionality of the mobile network components are commonly known to the person skilled in the art of the present invention so that the explanation thereof is omitted here. Also according to the present invention, the mobile communication network 28 is not restricted to any particular type of mobile communication standard long as it is possible to generate service event information from the specification underlying the operation of the mobile communication network.

As shown in FIG. 2, the at least one capturing point 46-1, . . . 46-5 may provided in relation to at least one of
- the base station node 38-1, 38-2 of the mobile communication network 28 to capture service event information describing radio communication conditions;
- the mobility management entity 44 of the mobile communication network 28 to capture service event information describing mobility information for the robotic device 24;
- the service gateway 40 of the mobile communication network 28 to capture service event information describing communication service quality for the communication service used to exchange control requests;
- the packet gateway 42 of the mobile communication 28 to capture service event information describing user plane communication traffic contents reflecting a control request, a control response, and/or control related timing information;
- the local control unit 30 for control of the robot device 24 to capture service event information describing a position of a robot device sub-component and/or junctions of the robot device 24; and/or
- the monitoring unit used for monitoring the robotic device 24 to capture service event information describing a position of a robot device sub-component and/or junctions of the robot device 24.

As shown in FIG. 2, the Cloud-based remote control system 22 comprises a remote control unit 32, a cache memory 34, and a control processing unit 36.

Operatively, the cache memory 34 is adapted for pre-storage of control pattern information for the robotic device 24.

Operatively, control processing unit 36 is adapted to calculate control pattern information prior to start of control of the robotic device 24. Here, the control processing unit 36 may be adapted to calculate control pattern information when a cache hit rate for control pattern information is below a predetermined cache hit rate threshold value. Also, the control processing unit 36 may be adapted to optimize control pattern information upon report of a poor service quality incidence.

Operatively, the remote control unit 32 will use the processing result of the control processing unit 36 as stored in the cache memory 34 so as to realize the first process 12 for remote control as shown in FIG. 1.

As shown in FIG. 2, analytics system 26 provides service quality information to the Cloud-based remote control system 22. Also, the analytics system may provide information to an external alarm/incident monitoring system, an operational support system (OSS), and/or a network monitoring/management system.

Figure 3:
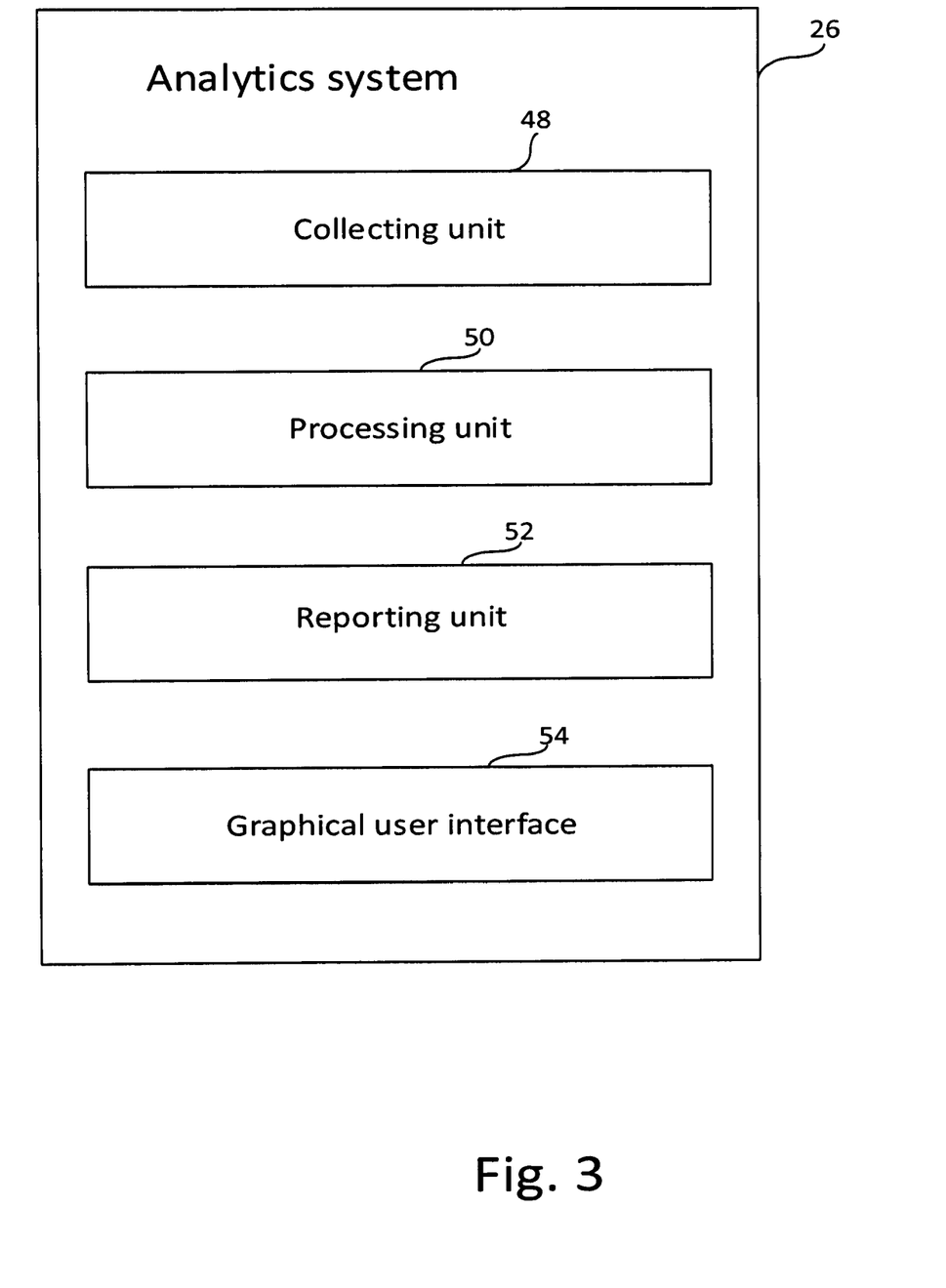
FIG. 3 shows a schematic diagram of the analytics system shown in FIG. 2 for providing service quality information to the Cloud-based remote control system according to the present invention.

FIG. 3 shows a schematic diagram of the analytics system 26 shown in FIG. 2 for providing service quality information to the Cloud-based remote control system 22 according to the present invention.

As shown in FIG. 3, the analytics system 26 comprises a collecting unit 48, a processing unit 50, a reporting unit 52, and as an option a graphical user interface 54.

Operatively, the collecting unit 48 collects service event information in relation to an associated control request issued by the Cloud-based remote control system 22 from the mobile communication network 28, the local control unit 30, and/or a monitoring unit (not shown in FIG. 3) monitoring the robotic device 24. Preferably, the collecting unit 48 collects service event information in real time and in relation to a movement session of the robotic device 24 described by at least one control request.

Further, operatively the processing unit 50 correlates the service event information with the associated control request, calculates at least one key performance indicator from the result of correlation, analyzes the at least one key performance indicator for identification of a poor service quality incidence, and generates a service quality report based on the result of analysis upon occurrence of a poor service quality incidence. Preferably, the processing unit 50 is adapted to correlate the service event information with the associated at least one control request in real time.

Further, operatively the reporting unit 52 communicates the service quality report to the Cloud-based remote control system 22 and/or a network management system of the mobile communication network 28. Preferably, the reporting unit 52 communicates the service quality report to an external alarm/incident monitoring system.

Further, operatively the graphical user interface 54 displays a visualization of the service quality report.

Figure 4:
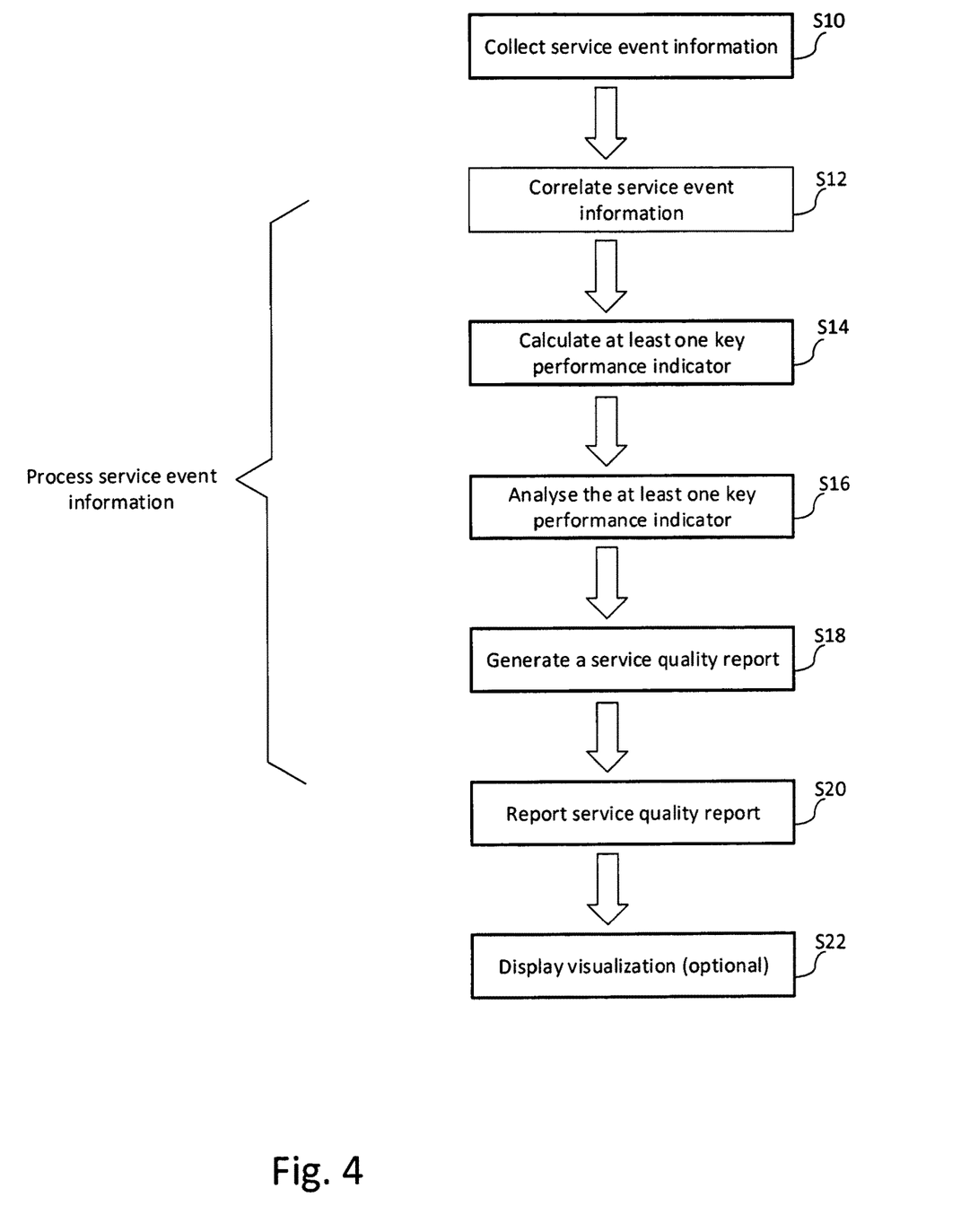
FIG. 4 shows a flowchart of operation for the analytics system shown in FIG. 3.

FIG. 4 shows a flowchart of operation for the analytics system 26 shown in FIG. 3.

As shown in FIG. 4, operatively the collecting unit 48 executes a step S10 of collecting service event information in relation to an associated control request issued by the Cloud-based remote control system 22 from the mobile communication network 28, the local control unit 30, and/or a monitoring unit monitoring the robotic device 24. Preferably, the step S10 is executed in real time during delivery of the remote control service to the robotic device 24.

As shown in FIG. 4, operatively the processing unit 50 then processes the collected service event information.

Heretofore, operatively the processing unit 50 executes a step S12 to correlate the service event information with the associated control request, a step S14 to calculate at least one key performance indicator from the result of correlation, a step S16 to analyze the at least one key performance indicator for identification of a poor service quality incidence, and a step S18 to generate a service quality report based on the result of analysis upon occurrence of a poor service quality incidence.

Preferably, the step S12 is executed in real time during delivery of the remote control service to the robotic device 24.

As shown in FIG. 4, operatively the reporting unit 52 executes a step S20 to report the service quality report to the Cloud-based remote control system 22 and/or a network management system of the mobile communication network 28. It should be noted that the step S20 may be executed to communicate the service quality report also to an external alarm/incident monitoring system.

As shown in FIG. 4, operatively the graphical user interface 54 executes a step S22 to visualize the report data to a user of the analytics system 26. Here it should be noted that the step S22 is optional.

Figure 5:
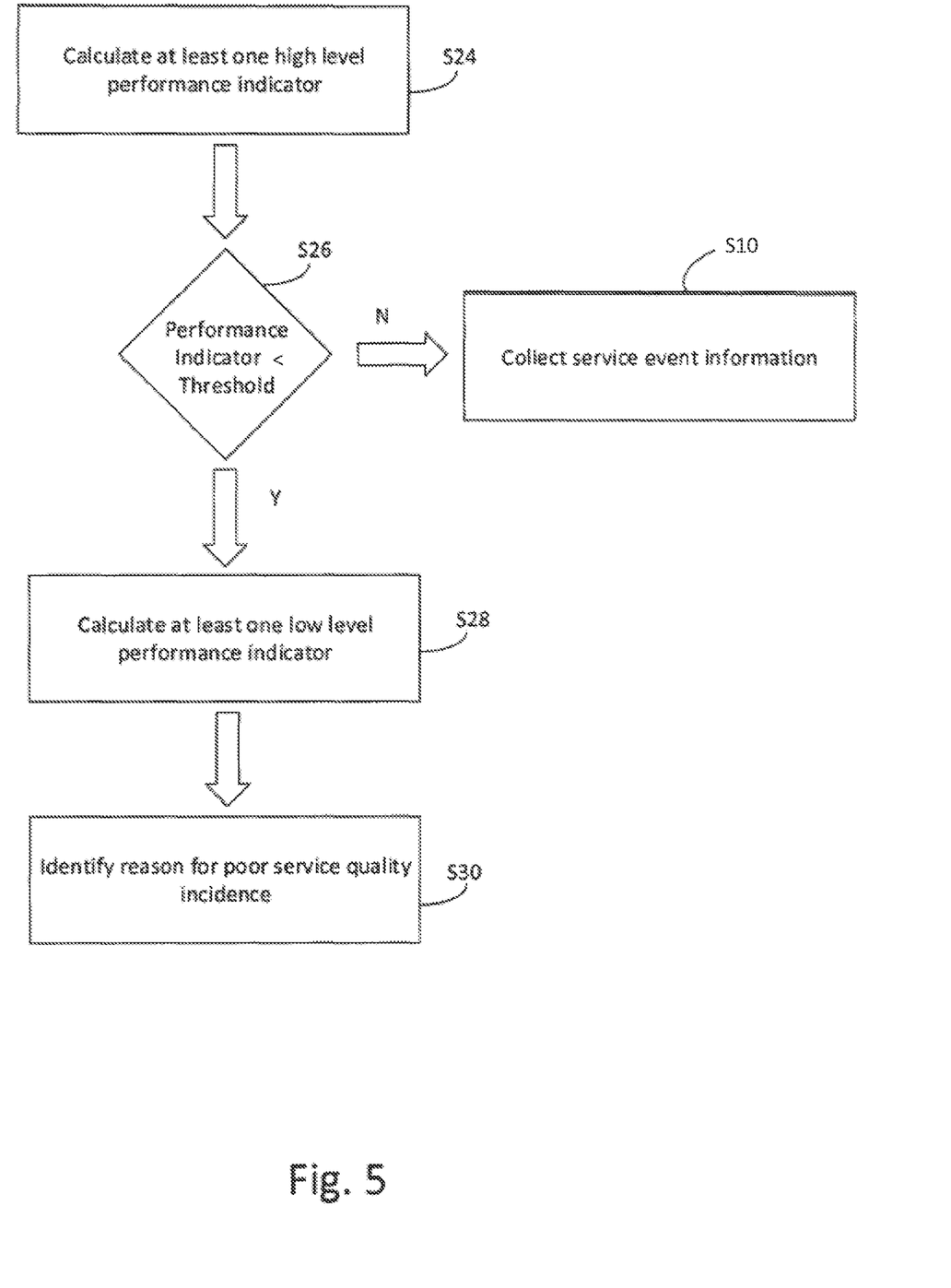
FIG. 5 shows another flowchart of operation for the analytics system shown in FIG. 3.

FIG. 5 shows another flowchart of operation for the analytics system shown in FIG. 3, in particular with respect to the calculation of key performance indicators.

As shown in FIG. 5, operatively the processing unit 50 executes a step S24 to calculate at least one high level performance indicator reflecting a service quality as control deviation against a control target for a service under control.

As shown in FIG. 5, operatively the processing unit 50 executes a step S26 to evaluate whether at least one high level performance indicator is lower than a predetermined threshold. If this is not the case, the processing unit 50 proceeds to again to step S10 to re-iterate collection of service event information.

As shown in FIG. 5, when at least one high level performance indicator is lower than a predetermined threshold the processing unit 50 executes a step S28 to calculate at least one low level performance indicator reflecting at least one reason for the poor service quality incidence.

Here, the at least one low level performance indicator may reflects operation of the wireless communication network 28 and/or the Cloud-based remote control system 22.

Further, the at least one low level performance indicator may be related to the operation of the wireless communication network 28 and reflect at least one of:
 operation of radio environment in the wireless communication network 28;
 operation of handover in the wireless communication network 28;
 operation of transport layer in the wireless communication network 28; and
 operation of media handling in the wireless communication network 28.

Further, the at least one low level performance indicator is related to the operation of the Cloud-based remote control system 22 and reflects at least one of
 availability of a cached movement trajectory for the robotic device 24;
 precision of a cached movement trajectory for the robotic device 24;
 execution timing of a movement trajectory for the robotic device 24;
 start position, end position and, optionally, at least one intermediate point of a movement trajectory for the robotic device 24;
 returned start position, end position and, optionally, at least one intermediate point of a movement trajectory for the robotic device 24; and
 at least one time stamp and control request ID of a control request issued in relation a movement trajectory for the robotic device 24.

As shown in FIG. 5, once at least one low level performance indicator is available the processing unit 50 executes a step S30 to determine at least one reason for the poor service quality incidence. Details of such determination will be explained in the following with respect to FIGS. 6 and 7, respectively.

Figure 6:
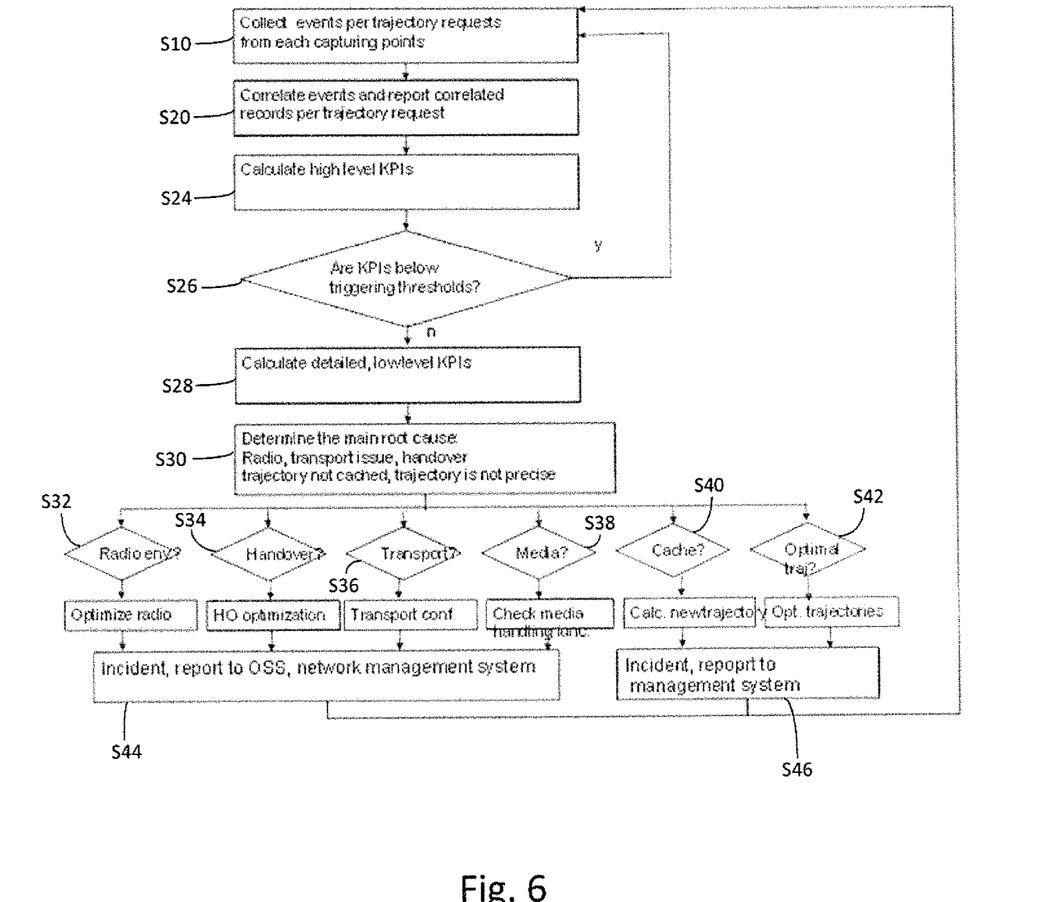
FIG. 6 shows an application example for operation of the analytics system shown in FIG. 3 with respect to the control of a robotic device.

FIG. 6 shows an application example for operation of the analytics system 28 shown in FIG. 3 with respect to the control of the robotic device 24.

The first six steps shown in FIG. 6 correspond to the steps S10, S20 to S30 explained above with respect to FIGS. 4 and 5 when being applied to the consideration of a movement trajectory of the robot device 24 and thus will not described here to avoid redundancy.

Generally and as outlined above, the analytics system 26 collects event information from different network domains and nodes:
 Nodes B 38-1. 38-2 provide info about the actual radio conditions;
 MME 44 provide info about mobility; and/or
 A packet probe captures the user plane traffic to report each control request, response and the related timing information.

To achieve this and as shown in FIG. 6, see step S32, the radio nodes 38-1, 38-2 of the mobile communication network 28 provide event info regarding the uplink (UL) and downlink (D(DL) radio conditions. In DL, the 3GPP defined RSRP and RSRQ are collected characterizing the signal strength and quality, respectively. In UL direction the events reporting the power restriction measure and SINR are used and collected.

As shown in FIG. 6, see step S34, the mobility management node 44 provides information about the handover, e.g., attempt, success and time. The handover is critical operation in the mobile communication network 28, therefore, it can influence the quality of control significantly. It can be important for drones or other moving robots.

A shown in FIG. 6, see step S36 and S38, the packet probe installed at the interface of the service gateway 40 interface captures the user plane traffic and provides type, content and timing info about the request and response messages towards the control services implemented in the Cloud-based remote control system 22.

As shown in FIG. 6, see steps S40 and S42, the analytics system 26 also collects the actual position of the robot head and junctions provided by a local control unit 30 and the monitoring unit which may be an independent monitoring device, e.g. a camera system.

The above information is collected and correlated in real time and recorded for each robotic device 24 and for each movement session, i.e. one or more control requests.

Using the correlated records the analytics system 26 calculates high level key performance indicators KPI, such as precision and timing of robotic movement.

Here, the timing and precision high-level key performance indicators (KPIs) are related to low level key performance indicators (KPI) which characterizes the operation of the different network domains or Cloud functionalities. This info is used for identifying the root cause of poor performance. It is also used for optimizing Cloud based functionalities, such as trajectory calculation and caching as will be explained in the following with respect to FIG. 7.

In conclusion, the analytics system 26 provides quality of service for remote robotic control. The quality of control is provided for the mobile communication network 28, which includes radio interface, where the quality of transmission depends significantly on the radio conditions.

Further, high-level key performance indicators (KPI) characterize the robot control operation and are correlated with the key performance indicators (KPI) characterizing the performance of the radio interface, other network domains and the cloud-based robot control functionalities.

This allows monitoring optimization and troubleshooting of cloud based robotic control through mobile networks.

As shown in FIG. 6, see steps S44 and S46, this can be used in an external alarm system to notify operators that interaction is needed. The network related incidents are reported to the network management system.

Figure 7:
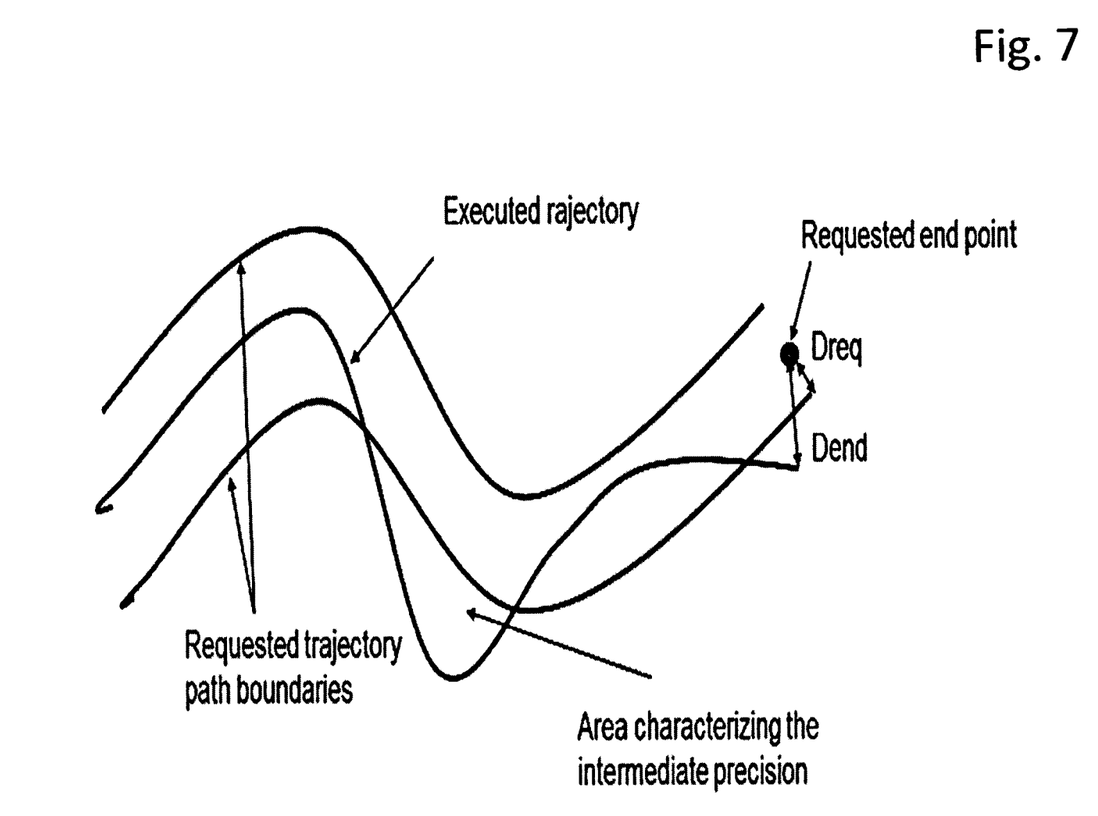
FIG. 7 shows examples for the handling of key performance indicators for remote robot device trajectory control.

FIG. 7 shows examples for the handling of key performance indicators for remote robot device trajectory control.

As shown in FIG. 7, the at least one high level performance indicator reflects precision and/or timing of a robotic device movement.

Here, for consideration of the movement trajectory of the robot device 24 the local control unit 30 or external monitoring unit provides information of the actual position of each robotic movement end points as a function of the time.

As an example, quality of trajectories of the robot device 24 are described by
  Trajectory request event including start position, end position and intermediate positions if needed;
  Requested precision and execution time;
  Info if trajectory is available in Cache or should be calculated, Available in Cache=true, false;
  Trajectory calculation request and response;
  Response event, including the returned trajectory start, end and intermediate positions; and/or
  Time stamp and request ID of the above events.

The above info is collected in a correlated record which is then analyzed in the analytics system 26.

Here, examples for high-level key performance indicators (KPIs) are the
  End point precision Rdp=(Dend−Dreq)/Dreq;
  The area characterizing the intermediate precision, Ap, see FIG. 7; and/or
  Execution time comparing to the requested time Rtp=(Tend−Treq)/Treq.

These are relative quantities comparing to the requested target values. For high-level key performance indicators for poor service quality incidence (KPI) thresholds are configurable or can be set by the operator as follows:
  For example: Rdp>0.05, AP>0.01 m$^2$ or Rtp>0.1

If threshold values are exceeded, the system calculates low-level key performance indicators (KPIs). Low-level key performance indicators (KPIs) are used for identifying the network domain, which is the source of the issue and determining the root cause of the problem. For example:
  RSRP<−120 dBm, radio coverage issue;
  RSRQ<−15 dB interference issue;
  HO execution time >100 ms, or HO success rate <0.95 HO problem;
  Packet loss >0.05 or RTT >100 ms transport issue;
  Web access time >1 s or web access failure rate >0.05 web server or media issue;
  In these case incidents are generated and reported to the mobile network OSS or network management system
  In case of Cache hit rate <0.6, trajectory calculations are needed; and/or
  If the requested trajectories are not optimum, trajectory optimization is requested.

Further to the above it should be noted that available analytics systems for mobile broadband traffic heavily rely on protocol specific information. For instance QoE estimation for media can only be done with digging deep into the media transport format and system. This can be either gained from Deep Packet Inspection or for specific information elements e.g., the timing information for the media segments there is a timestamp information in the RTP protocol.

To the contrary in industrial protocols that are used for robot control according to the present invention as timing is more crucial than for standard wireless communication services related protocols usually have built-in timing information. E.g., in Profinet there is also a timestamp information in each frame called cycle counter. In industrial protocols most of the traffic is unencrypted thus obtaining the information requires only shallow packet inspection.

In conclusion the advantages of the present invention may be summarized as follows:
  Analytics system for robotics control that combines mobile and cloud networks;
  Capturing points and collected info from capturing points;
  High/level KPIs for robotic control;
  The work flow and decision logic of the analytical system; and
  Reporting incidents to cloud or network management system based on the low/level KPI analysis.

The invention claimed is:

1. An analytics system for providing service quality information to a cloud-based remote control system, wherein the cloud-based remote control system issues control requests to a local control unit for control of a robotic device, wherein a mobile communication network connects the cloud-based remote control system with the local control unit, the analytics system comprising:
  collecting circuitry adapted to collect service event information in relation to an associated control request issued by the cloud-based remote control system from the mobile communication network, the local control unit, and/or a monitoring unit monitoring the robotic device;
  processing circuitry configured to:
    correlate the service event information with the associated control request;
    calculate, from a result of the correlation, at least one high level performance indicator reflecting a service quality as control deviation against a control target for a service under control;
    analyze the at least one high level performance indicator for identification of a poor service quality incidence, and when the at least one high level performance indicator is lower than a predetermined threshold, calculate at least one low level performance indicator reflecting at least one reason for the poor service quality incidence; and
    generate a service quality report based on a result of the analysis upon occurrence of the poor service quality incidence; and
  reporting circuitry configured to communicate the service quality report to the cloud-based remote control system and/or a network management system of the mobile communication network.

2. The analytics system of claim 1, wherein the at least one high level performance indicator reflects precision and/or timing of a robotic device movement.

3. The analytics system of claim 1, wherein the at least one low level performance indicator reflects operation of the mobile communication network and/or the cloud-based remote control system, and is used to identify the at least one reason for the poor service quality incidence.

4. The analytics system of claim 3, wherein the at least one low level performance indicator is related to the operation of the mobile communication network and reflects:
  operation of radio environment in the mobile communication network;
  operation of handover in the mobile communication network;
  operation of transport layer in the mobile communication network; and/or
  operation of media handling in the mobile communication network.

5. The analytics system of claim 3, wherein the at least one low level performance indicator is related to an operation of the cloud-based remote control system and reflects:
availability of a cached movement trajectory for the robotic device;
precision of the cached movement trajectory for the robotic device;
execution timing of a movement trajectory for the robotic device;
start position and end position of the movement trajectory for the robotic device;
returned start position and end position of the movement trajectory for the robotic device; and/or
at least one time stamp and control request identifier of a control request issued in relation to the movement trajectory for the robotic device.

6. The analytics system of claim 1:
wherein the collecting circuitry is configured to collect the service event information in real time and in relation to a movement session of the robotic device described by the associated control request; and
wherein the processing circuitry is configured to correlate the service event information with the associated control request in real time.

7. A cloud-based robot control monitoring and optimization system, comprising:
a cloud-based remote control system comprising at least a remote control circuitry, a control processing circuitry, and a cache memory, the cloud-based remote control system configured to run a remote control service for control of a robotic device;
a local robot control circuitry;
a mobile communication network configured to establish a communication link between the remote control circuitry and the local robot control circuitry; and
an analytics system for providing service quality information, the analytics system comprising:
collecting circuitry adapted to collect service event information in relation to an associated control request issued by the cloud-based remote control system from the mobile communication network, the local robot control circuitry, and/or a monitoring circuitry monitoring the robotic device;
processing circuitry configured to:
correlate the service event information with the associated control request;
calculate, from a result of the correlation, at least one high level performance indicator reflecting a service quality as control deviation against a control target for a service under control;
analyze the at least one high level performance indicator for identification of a poor service quality incidence, and when the at least one high level performance indicator is lower than a predetermined threshold, calculate at least one low level performance indicator reflecting at least one reason for the poor service quality incidence; and
generate a service quality report based on a result of the analysis upon occurrence of the poor service quality incidence; and
reporting circuitry configured to communicate the service quality report to the remote control circuitry and/or a network management system of the mobile communication network.

8. The cloud-based robot control monitoring and optimization system of claim 7, further comprising at least one capturing point provided in relation to a network domain of the mobile communication network, the local robot control circuitry, and/or the monitoring circuitry for monitoring the robotic device and configured to capture the service event information for processing by the analytics system.

9. The cloud-based robot control monitoring and optimization system of claim 8, wherein the at least one capturing point is provided in relation to at least one of:
a base station node of the mobile communication network to capture the service event information describing radio communication conditions;
a mobility management entity of the mobile communication network to capture the service event information describing mobility information for the robotic device;
a service gateway of the mobile communication network to capture the service event information describing communication service quality for a communication service used to exchange control requests;
a packet gateway of the mobile communication to capture the service event information describing user plane communication traffic contents reflecting a control request, a control response, and/or control related timing information;
the local robot control circuitry to capture service event information describing a position of the robotic device sub-component and/or junctions of the robotic device; and/or
the monitoring circuitry used for monitoring the robotic device to capture the service event information describing the position of the robotic device sub-component and/or the junctions of the robotic device.

10. The cloud-based robot control monitoring and optimization system of claim 7:
wherein the at least one key performance indicator reflects operation of the mobile communication network and/or the Cloud-based remote control system and is used to identify a reason for the poor service quality incidence; and
wherein the at least one key performance indicator is used to optimize the remote control service for control of the robotic device.

11. The cloud-based robot control monitoring and optimization system of claim 7, further comprising a cache memory configured to pre-store control pattern information for the robotic device.

12. The cloud-based robot control monitoring and optimization system of claim 7, further comprising control processing circuitry configured to calculate control pattern information prior to start of control of the robotic device.

13. An analysis method for providing service quality information to a cloud-based remote control system, wherein the cloud-based remote control system issues robotic device control requests to a local control unit, wherein a mobile communication network connects the cloud-based remote control system with the local control unit, the analysis method comprising:
collecting service event information in relation to an associated control request issued by the cloud-based remote control system from the mobile communication network, the local control unit, and/or a monitoring unit monitoring the robotic device;
correlating the service event information with the associated control request;
calculating, from a result of the correlation, at least one high level performance indicator reflecting a service quality as control deviation against a control target for a service under control;

analyzing the at least one high level performance indicator for identification of a poor service quality incidence, and when the at least one high level performance indicator is lower than a predetermined threshold, calculate at least one low level performance indicator reflecting at least one reason for the poor service quality incidence;

generating a service quality report based on a result of the analysis upon occurrence of the poor service quality incidence; and reporting the service quality report to the cloud-based remote control system and/or a network management system of the mobile communication network.

14. The analysis method of claim 13, wherein the at least one high level performance indicator reflects precision and/or timing of a robotic device movement.

15. The analysis method of claim 13, wherein the at least one low level performance indicator reflects operation of the mobile communication network and/or the cloud-based remote control system, and is used to identify the at least one reason for the poor service quality incidence.

16. The analysis method of claim 15, wherein the at least one low level performance indicator is related to the operation of the mobile communication network and reflects:

operation of radio environment in the mobile communication network;

operation of handover in the mobile communication network;

operation of transport layer in the mobile communication network; and/or operation of media handling in the mobile communication network.

17. The analysis method of claim 15, wherein the at least one low level performance indicator is related to an operation of the cloud-based remote control system and reflects:

availability of a cached movement trajectory for the robotic device;

precision of the cached movement trajectory for the robotic device;

execution timing of a movement trajectory for the robotic device;

start position and end position of the movement trajectory for the robotic device;

returned start position and end position of the movement trajectory for the robotic device; and/or at least one time stamp and control request identifier of a control request issued in relation to the movement trajectory for the robotic device.

18. The analysis method of claim 13, wherein the collecting is executed to collect the service event information in real time and in relation to a movement session of the robotic device described by the associated control request; and the correlating comprises correlating the service event information with the associated control request in real time.

* * * * *